US006965907B2

(12) United States Patent  (10) Patent No.: US 6,965,907 B2
Klass  (45) Date of Patent: Nov. 15, 2005

(54) APPARATUS FOR GENERATING RANDOM NUMBERS

(76) Inventor: Michael Jay Klass, 2509 Tamalpais Ave., El Cerrito, CA (US) 94530

( * ) Notice: Subject to any disclaimer, the term of this patent is extended or adjusted under 35 U.S.C. 154(b) by 0 days.

(21) Appl. No.: 10/330,421

(22) Filed: Dec. 26, 2002

(65) Prior Publication Data

US 2003/0131031 A1 Jul. 10, 2003

Related U.S. Application Data

(62) Division of application No. 09/271,618, filed on Mar. 17, 1999, now Pat. No. 6,539,410.

(51) Int. Cl.[7] .............................. G06F 7/58; G06J 1/00
(52) U.S. Cl. .......................................... 708/255; 708/3
(58) Field of Search .......................... 708/3, 250–256, 708/801

(56) References Cited

U.S. PATENT DOCUMENTS

| | | | |
|---|---|---|---|
| 4,547,670 A | | 10/1985 | Sugimoto et al. |
| 4,641,102 A | | 2/1987 | Coulthart et al. |
| 4,833,633 A | | 5/1989 | Morris |
| 4,855,690 A | | 8/1989 | Dias |
| 4,886,958 A | | 12/1989 | Merryman et al. |
| 5,307,410 A | | 4/1994 | Bennett |
| 5,696,828 A | | 12/1997 | Koopman, Jr. |
| 5,764,765 A | | 6/1998 | Phoenix et al. |
| 5,987,483 A | | 11/1999 | Edelkind et al. |
| 6,195,669 B1 | | 2/2001 | Onodera et al. |
| 6,249,009 B1 | * | 6/2001 | Kim et al. ................... 250/580 |
| 6,393,448 B1 | * | 5/2002 | Dultz et al. .................. 708/250 |
| 6,415,309 B1 | * | 7/2002 | Shilton ........................ 708/250 |
| 6,542,014 B1 | * | 4/2003 | Saito ........................... 327/164 |
| 6,609,139 B1 | * | 8/2003 | Dultz et al. .................. 708/250 |
| 2002/0080912 A1 | * | 6/2002 | Mackie et al. ................. 378/21 |

FOREIGN PATENT DOCUMENTS

EP    0 828 349 A1    3/1998

OTHER PUBLICATIONS

Bennett, Charles H., et al., Quantum Cryptography, Scientific American, Oct. 1992, pp. 50–57.
Buslenko, N.P., et al., The Monte Carlo Method, The Method of Statistical Trials, edited by Yu. A. Schreider, Pergamon Press Ltd., Headington Hill Hall, Oxford, 4 & 5 Fitzroy Square, London W.1, Copyright ©1966, First English edition, 1966, pp. 257–305.
Dillard, G.M., et al., An Electronic Generator of Random Numbers, IRE Transactions On Electronic Computers, vol. EC–11, Apr., 1962, No. 2, p. 284.
Halling, H., et al., Random Pulse–Burst Generator For Simulation Of Gaussian Distribution, Nuclear Instruments And Methods, A Journal On Accelerators, Instrumentation and Techniques In Nuclear Physics, vol. 93, May/Jun. 1971, © North–Holland Publishing Company, Amsterdam, pp. 171–172.
Hariharan, P., et al., Ultra–high–frequency beats produced by laser modes at the single–photon level, Journal Of Modern Optics, 1995, vol. 42, No. 3, © 1995 Taylor & Francis Ltd, pp. 565–567.

(Continued)

*Primary Examiner*—Tan V. Mai
(74) *Attorney, Agent, or Firm*—Blakely, Sokoloff, Taylor & Zafman LLP

(57) ABSTRACT

An apparatus for generating random numbers includes a source for generating random quantum phenomena, a detector to detect instances of the random quantum phenomena, and a recorder to record the instances of the random quantum phenomena for use in generating random numbers.

28 Claims, 5 Drawing Sheets

OTHER PUBLICATIONS

Houard, J.C., Classical limit and quantum measurements in the detection of photons, Physical Review A, vol. 54, No. 6, Dec. 1996, © 1996 The American Physical Society, pp. 4719–4740.

Martino, Anthony J., Optical random number generator based on photoevent locations, Applied Optics, vol. 30, No. 8, Mar. 10, 1991, pp. 981–988.

Matsuo, Kuniaki, et al., Thomas point process in pulse, particle, and photon detection, Applied Optics, vol. 22, No. 12, Jun. 15, 1983, pp. 1898–1909.

Matthews, Robert, It's a Lottery, New Scientist, vol. 147, No. 1987, Jul. 22, 1995, published by IPC Magazines Ltd., Reed Publishing Europe, pp. 38–42.

Rarity, JG, Quantum Cryptography and Quantum Computation, Conference on Lasers and Electro–Optics Europe Technical Digest, 1996, p. 36 JMA3.

Saleh, Bahaa E.A., et al., Multiplied–Poisson Noise in Pulse, Particle and Photon Detection, Proceedings Of The IEEE, vol. 70, No. 3, Mar. 1982, ©1982 IEEE, pp. 229–245.

Takeuchi, S., et al., High Performance Random Pulser Based On Photon Counting, IEEE Transactions on Nuclear Science, vol. NS–33, No. 1, Feb. 1986, © 1986, 1985 Nuclear Science Symposium, 1985 Symposium On Nuclear Power Systems, San Francisco, CA, Oct. 23–25, 1985, pp. 946–949.

* cited by examiner

APPARATUS FOR GENERATING RANDOM NUMBERS

This application is a divisional of application Ser. No. 09/271,618, entitled "A RANDOM NUMBER GENERATOR" filed Mar. 17,1999 now U.S. Pat No. 6,539,410.

BACKGROUND OF THE INVENTION

1. Field of the Invention

This invention relates to random number generators and in particular to random number generators based on detection of quantum phenomena.

2. Description of the Related Art

A random number generator is a device which produces a stream of random numbers or numbers that are nearly random, and not always the same number. A number in this stream is said to be fully random if it has no "memory" of what has gone before it. Statistically speaking, its conditional probability distribution given the past, being independent of its past, equals its unconditional probability distribution. Moreover, it is usually desirable that, for each integer $n \geq 1$, the so-called marginal distribution of the nth number in the stream have the same distribution as the first one. The numbers are then said to be stationary (or have identical distributions). For simplicity, all sequences of truly random numbers are generally to be interpreted as being fully random and stationary, and as possibly having equally likely occurrences of each number being produced, as the context might hopefully indicate. It has proved to be very difficult to produce truly random numbers. While people may be capable of producing somewhat random numbers by picking numbers out one at a time, they certainly cannot do so fast enough to meet the requirements of modern usage. Therefore, for all practical purposes, machines are used to produce random numbers.

Most machines and methods heretofore employed for producing random numbers are either "deterministic"—they follow a fixed, totally predictable recipe—or else are still far from truly random. Some devices produce nearly truly random numbers, but they are subject to being skewed by external influences or are very delicate and expensive to maintain. For many purposes an approximation of randomness has turned out to be acceptable. For an increasing number of other purposes, something closely approximating true randomness is a necessity.

Random numbers are most commonly thought of as having security applications such as for sending encrypted messages. Random numbers are useful for security purposes because they create inherently unpredictable sequences which cannot be easily duplicated, studiously replicated or discovered by accident. For many lower security applications, a random number generator with a reasonable degree of randomness will suffice. Higher security applications demand a greater degree of true randomness.

Another problem that exists with current random number generators, apart from the "level of randomness" of the numbers that they are able to produce, is that sufficient numbers of random numbers cannot be produced quickly enough for contemporary applications. This is significant in security applications where messages are encoded with a string of random numbers by adding a bit in the string to each bit in the message. The result appears to be nonsense to any recipient until it is decoded by subtracting out the string to recover the message. Ideally, the random number string should be as long as the message itself. In practice, a string—known as a "key"—is used repeatedly and it is hoped the string cannot be discovered. The length of the key is critically important because each additional random bit in the string doubles the security level of the cipher. Naturally, if production of sufficient numbers of random numbers were possible and practical, the level of security enjoyed for encrypted messages would increase exponentially.

In addition to security applications, random numbers are increasingly essential for scientific investigations including studies of physical laws, investigations and constructions of probability distributions, analyses of the performance of mathematical algorithms in principle and as applied practically to devices, and notably for development of artificial intelligence. Random number generators are used in the assessment of the performance of machines to help construct a large variety of representative situations. The sampling thus obtained provides feedback which is used to learn more about the process or operation being studied. As with security applications, problems exist regarding the availability of a sufficient volume of random numbers and with the true randomness of the numbers produced. In a growing number of areas of scientific inquiry, the ability to produce large numbers of random numbers can be critical. Certain research, such as large-scale Monte Carlo simulations, requires millions of random numbers to yield useful information. In sensitive analyses where essentially true randomness in a sampling is necessary to obtain sound results, any significant lack of randomness can unacceptably skew test data and frustrate the research.

In part due to the need for large numbers of random numbers, the technique of producing "pseudo-random" numbers evolved. Pseudo-random numbers are generated using an arithmetical algorithm having an output of numbers which can pass many statistical tests of randomness. Another important aspect of arithmetically produced random numbers is that they can be replicated. This is useful for purposes of testing and analyses, but potentially disastrous for security applications. While pseudo-random numbers are statistically random for most applications, and have the application specific advantage of being reproducible, they suffer from one major flaw—they repeat. For example, a popular pseudo-random number generator is the linear-congruential generator. The linear-congruential generator of degree k produces non-negative integers less than some given integer m, where $m \geq 2$. At some point, if the generator is asked to produce $m^k + k$ integers, its last k integers must have already occurred previously. Since each integer produced by the generator is based on the same algorithm, and is therefore dependent on the previous k integers, this leads into a cycle of repetition that the generator cannot escape. In this sense, each pseudo-random number generator has a finite period. The best linear-congruential generators have a period exceeding 2 billion. Shift-register algorithms have been used to greatly extend the period of the generator. Even so, the fact remains that, regardless of the length of the period of a pseudo-random number generator, the numbers which are the product of the technique are ultimately deterministic and certainly not truly random.

Most machines are understood to function in the realm of classical mechanics according to the physical laws stated by Newton. The Newtonian world (including the essentially mechanistic world of Maxwell's equations concerning the behavior of electricity and magnetism) has at its core, the feature and key premise that if all the initial conditions (positions, velocities, charges, etc.) of the components of an isolated physical system are known, all of its future behavior can be known and predicted. It is therefore ultimately deterministic, the generation of truly random numbers or random behavior therefrom being inherently impossible.

Moving closer to the observation of quantum phenomena, many devices have been constructed that take sample measurements of a physical process (sometimes a macro-scopic, but sometimes a micro-scopic process). The measurements are converted into a sequence of elements, each element hopefully having little or no memory (but whether these elements actually lack memory of any of their predecessors depends both on the measuring apparatus and the physical process). Production of random numbers from a physical process creates a string of numbers which, even if not purely random, may seem to be highly so and is largely unrepeatable. This lack of repeatability is a liability in scientific applications, but can be circumvented by recording and/or storing the actual numbers generated if it is not too costly. Conversely, lack of repeatability itself is not necessarily a disadvantage and may well be an asset in security applications and the investigation of artificial intelligence.

Ostensibly random numbers can be generated using "noise" created by minor fluctuations in electronic circuits. It is disputed whether such electronic noise devices generate true random numbers. Unfortunately, they are often innately slower than pseudo-random number generators making them unsuitable for any application where a substantial quantity of random numbers is required. Another drawback to noise based random number generators is that their delicate construction requires constant, minute checking to verify that the device has not skewed away from producing true randomness. Electronic noise devices can become unstable over time. Noise levels are typically affected by fluctuations in temperature and line voltage. Lastly, such devices are very sensitive to surrounding electro-magnetic fields so that any fluctuation in nearby electromagnetic fields can change the output of the device in a deterministic way, thereby skewing the noise away from randomness.

Because radioactive decay is thought to be a memoryless quantum process, independent from atom to atom, random numbers have been produced by monitoring the successive decay times of a chunk of radioactive material. Devices which do so are believed to produce essentially truly random results as opposed to electronic noise devices. However, radioactive materials must be shielded and may therefore be inappropriate for many locations, such as personal computers. As with noise based devices, radioactive decay devices produce random numbers at unacceptably slow rates.

Recently there have been advances in the production of random numbers using spatially stochastic processes. Using a two-dimensional position-sensitive photon-counting detector, the locations of detected photoevents on a two-dimensional detector are tracked. A random sequence of numbers is produced based upon the location (not the time) of photoelectrons emitted from a photocathode. While promising, random number generation based on photoevent locations suffers from a number of vexing problems. The photoevent random number generator is large in size, making it impractical for many applications. It is also complicated to set up and is dependent on position, resolution, speed and dead time.

Other advances in related fields have focused on the polarized nature of light. Photons have many different polarizations. If a photon is passed at normal incidence through a birefringent crystal, such as calcite, the photon will pass straight through the crystal, with its polarization unchanged if it is polarized perpendicular to what is referred to herein as the optic axis of the crystal. If the photon entering the crystal is already polarized along the optic axis, it will emerge with its polarization unchanged but be shifted to a different path than the photons with perpendicular polarization. The photons that have emerged from the crystal can be detected using detectors, such as photomultiplier tubes, established in the two respective paths. If a photon enters the crystal with an axis of polarization, say, half-way between the two rectilinear polarization directions, it will be repolarized into either rectilinear polarization direction and follow its corresponding path with equal probability. These repolarized photons are believed to lose all memory of their original diagonal polarization. Relying on the use of two detectors, the diagonally polarized photons have been utilized by quantum cryptographers to advance a clever scheme for secure exchange of a secret random key that can subsequently be used to send secret messages. An essential part of the scheme is to thwart eavesdroppers to the message, using the random repolarization of incident photons having polarizations diagonal to the optic axis of the crystal. Any measurements by the eavesdropper of such photons would repolarize them and erase the message content inherent in their original polarizations.

SUMMARY OF THE INVENTION

A random number generator is described having a black body source for generating quantum phenomena, a detector for detecting generated quantum phenomena and a recording system.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

DETAILED DESCRIPTION

Figure 1:
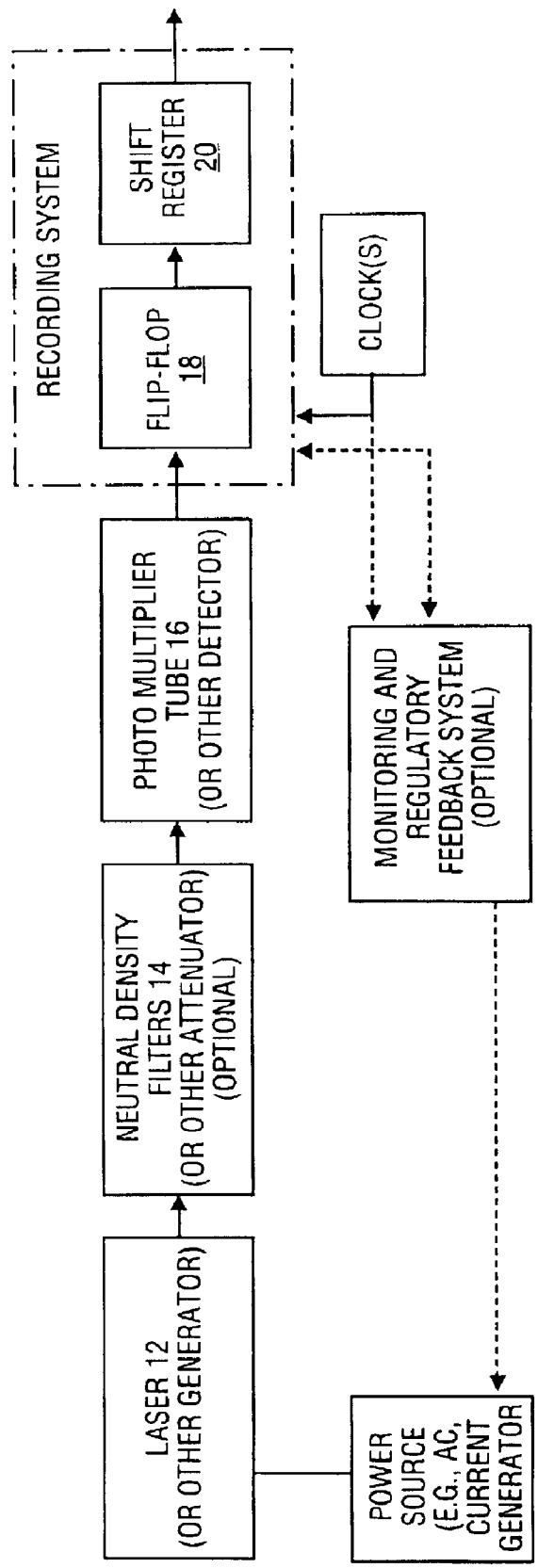
FIG. 1 is a block diagram of one embodiment of a random number generator according to the invention.

A random number generator is described. In the following description, numerous details are set forth, such as types of generators and detectors, types of quantum phenomena, properties of quantum phenomena, etc. It will be apparent, however, to one skilled in the art that the present invention may be practiced without these specific details. In other instances, well-known structures and devices are shown in block diagram form, rather than in detail, in order to avoid obscuring the present invention.

This invention utilizes probabilistic features of the creation, absorption, state transitions, and/or responses to energy barriers, and detection, etc., of quantum phenomena, such as, for instance, photons and electrons, as well as the molecular movements of gas molecules, together with various scientific and engineering aspects of the detection, regulating and recording process, to produce what amounts to a (roughly) independent and identically distributed non-constant detection pulse process or waveform from which random bits or random numbers can be extracted during a succession of deterministic or random length, adjustable time intervals.

In one embodiment, a quantum process is set-up which generates quantum phenomena at an appropriate rate in an essentially predetermined physical state or predetermined distribution of states, and the quantum process and/or its embodied environment induces these to make a transition into one of two or more subsequent states, according to a fixed non-degenerate probability transition distribution. This results in transition-based random numbers being generated, which are then detected by a detector and recorded by a recording device or system. For such an implementation (or in this instance), a mechanism to induce the emission of photons (or electrons) (or to excite electrons by only one, or by two, energy levels, for example) at a suitable rate may be needed. To maintain such a suitable rate, a monitoring and regulatory feedback system may be required. In an alternative embodiment, a data analysis technique due to John von Neumann in 1951 may be used in conjunction with the aforementioned monitoring and regulatory system. Moreover, for many applications, this data analysis technique by itself may be a viable alternative to a full-fledged monitoring and regulatory feed-back system.

The diagonally pre-polarized photons entering the (presumably rectangular-solid-shaped) calcite crystal constitute one example of a mechanism to emit photons. Another would be given by sending single photons (or even electrons) through single or multiple tiny apertures (or slits), and setting up two or more detectors, thereby utilizing the phenomena of diffraction and/or interference to generate random numbers.

The use of a calcite crystal can be further simplified. To obtain two distinct possible future photon paths, it is not necessary to rely on the photon's polarization or the use of a birefringent crystal. All that is needed is a flat piece of glass (possibly composed of dense flint). Held at an appropriate angle to a photon of wavelength w (and random polarization orientation), the glass surface will, with roughly equal probabilities, reflect or refract the photon (and have very low absorption probability). In one embodiment, to prevent interfering reflections from the back surface of the glass, the original surface could be part of the hypotenuse of a suitable right-angled prism.

Each of the above embodiments can be further simplified. Note first, that virtually every combined detection, monitoring and recording system requires implicit or explicit use of a clock. Thereby, if one knows the rate at which photons are striking either the crystal, the apertures, and/or the flat glass surface, the clock mechanism itself will permit one to drop all but one detector. The lone remaining detector is placed along only one of the primary future possible paths of the photon. Random bits can then be produced based on whether or not the detector received either at least one registered pulse or no registered pulse during each of a succession of distinct, suitably constructed time intervals. (Higher random bit rates can be achieved when there is more precision in the measurement system and quantities measured. For example, suppose that the time is measured from the start of a detection interval until the time a registered detection pulse is first received. Let $T_1, T_2, \ldots$ denote the successive elapsed times after the start of such (T1-like) time intervals. If the $T_j$ are nearly independent and identically distributed as exponential or geometric random variables with slowly varying parameter, the random variables $$X_j = \frac{T_{2j}}{T_{2j-1} + T_{2j}}$$

will be approximately independent and uniformly distributed on the unit interval in the ideal analog case and on the n-1 points $$\left\{ \frac{1}{n}, \frac{2}{n}, \ldots \frac{n-1}{n} \right\},$$

when the time interval $T_{2j-1}+T_{2j}$ has been digitized and split into n subintervals of equal length.) Since the randomization introduced above at the interface of the air and the crystal, air and glass, or at the apertures, is already present in the unpredictable character of the detection process itself (and probably also in most generation and attenuation procedures one might employ), the crystal, aperture(s), and flat glass may be dropped in favor of a more direct time-based procedure, relying primarily on the generation and detection processes themselves.

Time-based methods (and composites of the two methods) may be used to generate random numbers using quantum phenomena. To understand how, note that the time required for a quantum process to make a transition out of its current (initial) state is usually believed or assumed to be an exponentially distributed random variable having some fixed parameter depending only on this current state. Given this state, this random exit time is further assumed to be independent of the past. Independence is usually further assumed concerning what is happening at separate locations.

Thus (as a gedanken experiment), if one has a collection of n hydrogen atoms, each with its electron in an excited state k energy levels above the ground state, each electron would be assumed to wait a random time ($T_{kj}$ for the $j^{th}$ electron) until it made a transition out of that state.

When making a transition, it is assumed that the electron would move to the $i^{th}$ energy level with some probability $p_{ki}$, where $p_{ki} \geq 0$, $p_{ki} = 0$ for $i \geq k$, and $p_{k0} + p_{k1} + \ldots + p_{k,k-1} = 1$. It is assumed that for each k greater than or equal to 1, $T_{k1}, T_{k2}, \ldots, T_{kn}$ are independent exponentially distributed random variables, each equipped with the same fixed parameter $\lambda_k > 0$. For simplicity, take k=1. In this case, every transition out of the first energy level results in moving to the ground state (the zero$^{th}$ energy level) together with the simultaneous release of a photon of fixed characteristic wavelength. Although the above assumes that an electron jumps to a lower level when it moves out of any level, it may also move to a higher energy level as well.

Hence, by detecting a photon of such wavelength, electron transition times may be monitored and nearly detected. In fact, listing the transition times $T_{k1}, T_{k2}, \ldots, T_{kn}$ in order from smallest (i.e., the temporally first occurring time) to largest (i.e., the temporally last occurring time) produces the first n points in a constant rate Poisson process with rate determined entirely by $\lambda_k$ and n. So if each of the n photons so produced is independently detected with constant probability p>0 of detection, then the stream of detection pulses is also distributed as the first (roughly) np points of a constant rate Poisson process. From this detection pulse process, random numbers can be constructed.

A further method of generating random numbers includes sending, according to a roughly constant rate Poisson process, particles of some energy A or narrow distribution of such energies toward a quantum mechanical energy barrier of magnitude B>A and then counting those particles that manage to tunnel through the barrier. Yet other methods could be based on diffraction through a microscopic rectangular array of barrier pillars, or on circular polarization, possibly using chiral molecules.

A random number generator according to one embodiment comprises a generator of quantum phenomena, an attenuator of the quantum phenomena, a detector, and a recording system. An example of such a system is shown in FIG. 1. These elements may be combined together with a direct current, or suitably high-frequency alternating current, controllable power supply, monitoring and regulatory system, and the input phenomena may possibly be gated. The recording system may include, but is not limited to, a flip flop, one or more mechanisms to read and reset the flip flop, one or two clocks, and a shift register.

In one embodiment, a laser generates quantum phenomena by producing photons. It should be recognized that other quantum phenomenon generators could be used such as, for example, a cathode emitter for electrons. Photons generated by the laser are directed towards an attenuator to reduce the quantity of photons exiting the attenuator to a desired average number detected per second during an established time interval. This number may be inferred from data such as but not limited to: i. the rate at which the quantum phenomena are produced by the generator; ii. the rate of attenuation produced by the attenuator; and/or iii. the proportion of time that single (isolated or individual) quantum phenomena which enter the detector produce a registered pulse. The attenuator may be used to avoid exceeding either the capacity of the detector or the recording system, in addition to preventing the effect of the deterministic law of large numbers from overwhelming the inherent randomness of the successive individual quantum events. Hence there are many embodiments in which no attenuator is required.

The power of the laser and the reduction ability of the attenuator are coordinated to produce a desired average number $x>0$ of distinct (e.g., registered) detector (or detection) pulses of a suitable predetermined constrained amplitude and duration during a preliminary established (e.g., large) time interval. Even though the number of photons actually emitted is indeterminable, the number of registered detection pulses may be determined. In one embodiment, to generate random numbers from the registered pulses, the time between successive pulses is approximately an exponentially distributed random variable with essentially constant parameter and essentially independent from instance to instance. If the parameter is slowly changing (for example in response to the generator using a driving alternating current or pulsating direct current or due to slow variations in photon output due to heating effects, power line voltage fluctuations, etc.), it is possible to largely correct for this defect by a data analysis technique due to John von Neumann in 1951. In one embodiment, in which a constant, but controllable, DC current generator is included, a monitoring and regulatory feedback system may also be employed to ensure that a stable detection rate is maintained.

A detector receives the photons from the attenuator. In one embodiment, the detector is capable of recognizing a certain minimum threshold number of photons with a certain non-negligible probability, outputting a pulse of a certain minimum or constrained amplitude and a certain constrained duration. Such a pulse may be referred to herein as a registered pulse, a registered detector pulse, a registered detection, or a registered photon (quantum) event, etc. In one embodiment, the detector is capable of recognizing a single photon by outputting a registered pulse with a certain fixed non-negligible probability, which may depend on the wavelength of the photon.

If the threshold number is set too high (for example 10,000 or more), however, then relatively small percentage changes in photon output by the laser or other photon source may result in either every sample for a relatively extended time period exceeding the threshold and so generating a long string of ones (where a 1 indicates a sample exceeding the threshold), or else every sample in a relatively extended time period falling below the threshold and so generating a long string of zeroes (where a 0 indicates a sample not exceeding the threshold). This phenomena occurs whenever the change in photon output from its intended rate exceeds and tends to remain, say, plus (or minus) at least three to five or so times the square root of the threshold level, assuming that the detector's ability to detect a threshold is accurate up to (roughly) a plus or minus the square root of the threshold. While this difficulty is somewhat correctable via the von Neumann technique, the effect of having to employ it is to lose long bit strings while waiting for the device to somehow return to production of the critical number of photons per detection interval.

In one embodiment in which the duration of a registered pulse can be somewhat ignored, the electrical signals from the detector are used during a period of time T1 to (potentially) set a binary flip flop (or other recording system or mechanism) to the one state. The probability that the flip flop will be in the one state at the end of this T1 period is roughly a function of the ratio of T1 to the average time interval between registered pulses. For one case in which the registered detector pulses constitute a stationary independent (approximately Poisson) process, there is some real value of T1 which will make this probability equal to ½ (50%). To determine and communicate the state of the flip flop at time T1, additional time is typically needed. Thus, at some time increment T2 after the end of the period T1, the state of the flip flop can be determined. This state is used to set the next bit in the bit stream being generated, a one producing a one and a zero producing a zero (in one embodiment). Then the flip flop is reset to, for example, the zero state. After an additional time T3 following the T2 period, a new T1 period is started. The period T3 is used to allow time for the flip flop to be reset to the same (zero) state at the start of every T1 time period and to allow time for any pulses generated during the T1 time period to have dissipated with high probability. Thus, in such an embodiment, the total time required to generate one bit in the random binary bit sequence is T1+T2+T3.

Therefore, during each cycle period (of length T1+T2+T3), a value of zero is recorded if no registered pulses have occurred during (or from) the T1 portion of the cycle, and a value of one is recorded if one or more registered pulses have occurred.

If the duration of a detection pulse is too long relative to the T1 time interval to be ignored, neighboring bits may become dependent, showing bursts of ones. However, as long as the underlying photon emission process has certain independence properties, the independence of neighboring bits can be reestablished in convenient fashion. For example, when the photon (or quantum event) emission times constitute a (constant rate) Poisson process, independence from all previously generated bits may be achieved as soon as both the detector output pulse waveform and the waveform in the transmission channel into which the electrical detector signals from the new T1 time period will be deposited (as will be discussed in somewhat more detail below) drop to their respective "resting levels". Hence, by waiting a sufficiently long time after the end of the current T1 time period, it is permissible (with high probability) to begin the next one. In another embodiment, the detector pulse waveform amplitude and the amplitude of the relevant associated detector signal deposition channel could be checked at the beginning of each T1 time period, dropping the bit produced during that T1+T2+T3 cycle period if either amplitude exceeded its own relevant experimentally determined threshold, and retaining it otherwise. To increase the bit rate, one could continuously, or very frequently, monitor the detector output waveform and the waveform of the relevant temporally associated detector signal deposition channel, and begin the next T1 time period at the first feasible time after the end of the current T1+T2+T3 cycle such that each waveform is at its own respective "resting level".

The random numbers (bits) are directed to the shift register (of one embodiment of the recording system) as they are produced. For one case, in which the successive registered detector pulses are well approximated by a constant rate Poisson process, the probability of no received registered pulse during a time interval of length L is roughly exp$(-L\lambda)$, where $\lambda$ is the Poisson arrival rate. This quantity equals ½ when L=(ln 2)/$\lambda$. Here exp (x) is the usual exponential function of x, whose value is given by the infinite series 1+x+x2/2!+ .... Analogously, ln2 denotes the natural (Naperian) logarithm of 2, whose value is given by the infinite series 1−½+⅓−¼ . . . . Moreover, the approximate probability of one or more registered pulses occurring during such an interval L is 1−exp$(-L\lambda)$, which is also one-half when L=(ln2)/$\lambda$. For this reason, in one embodiment, the length of the T1 time period is set approximately equal to (ln2)/$\lambda$, giving an approximately independent, identically distributed (i.i.d.) stream of ones and zeroes of roughly a 50% chance of one and a 50% chance of zero. If so desired, these bits can be made more nearly purely random and equi-probable by passing to a subsequence.

When a photomultiplier tube (PMT) or electron multiplier tube (EMT) is used to detect quantum events, a registered detection pulse of a photon or an electron will typically result in about $10^6$ or $10^7$ electrons hitting the final dynode plate in the PMT (or EMT, etc.). This usually is an insufficient amount of charge to be directly recorded without further processing. Common photon counting procedures (which are close to typical needs) process the pulses outputted by the PMT (or other detector) by putting the pulse through a pre-amplifier (e.g., a wide band amplifier) which converts pulses to voltages. Thereafter, a main amplifier receives and amplifies the voltages. Then a discriminator (and/or comparator) compares the input voltage pulses with a preset reference voltage (threshold level) and eliminates pulses with amplitudes lower than this value. The output of the discriminator is sent to a pulse shaper and then to a counter which counts the pulses. The counter may be equipped with a gate circuit, which allows measurement at different timings and intervals. In addition, in one embodiment, to reduce false photon counts due to "ringing", a very short wiring or a coaxial cable (to match its impedance) may be used from the PMT or other detector. Such a solution is well known to those skilled in the practice of the art.

Some or all of these more specific electronic systems (and possibly others as well) may be employed to transform the output of the PMT or other detector into the desired binary bits, together with a First In, First Out (FIFO) buffering system and the aforementioned shift register (which shifts at the rate of once every T1+T2+T3 seconds or in correspondence with the completion of a bit producing T1+T2+T3 cycle period). The flip-flop device mentioned above is part of this succession of electronic devices in many embodiments.

If there is a desire or need to produce random bits as rapidly as possible, it may be necessary or desirable to send the electronic signals from the PMT (or other detector) and multiplex or distribute them sequentially into one of n channels, each of which is equipped with the electronics, such as described above, to independently convert the PMT output into an enhanced pulse which may be counted. The results of the conversion may then be demultiplexed and then sent to the shift register to create an output (random) bit. The multiplexor attains greater bit generation rates by overcoming the problems due to pulse width spread as the signal is enhanced. To understand how, suppose that once a pulse comes from the PMT, a total time of Tp seconds is required to process it from pre-amplification through to bit generation and resetting. When this time exceeds the T1+T2+T3 time period, or rather is large relative to the T1 time period, damaging pulse pileups may occur. To prevent this, some number n of disjoint and/or distinct amplification channels may be used, which can operate in parallel and which can be set in motion one-by-one in a succession (for instance, by use of a multiplexor) and which wraps around after the $n^{th}$ channel has been used.

Let $\Delta_s$ denote the time required by the multiplexor to shift from one channel to the next. At the completion of each T1 detection time period, the multiplexor shifts, sending the electrical signals from the PMT (or other detector) into the next available channel. This requires $\Delta_s$ time units to set up, after which a new T1 time period is begun (or eventually cleared to begin).

Thus, as long as n times T1+$\Delta_s$ equals or exceeds T1+$T_p$ and the electrical current in the first channel (and hence in each of the other channels in succession) can re-equilibriate within n times $\Delta_s$ plus n−1 times T1 seconds (time units), the bit generation can be performed successfully.

A further increase in the rate at which random bits can be produced can be obtained if one uses a position-sensitive PMT, having grid and fine-mesh dynode plates designed for this purpose, keeping track not only of whether and when a registered pulse occurred, but on what region of the final plate it was primarily located.

A random number generator is generally depicted in FIG. 1. In one embodiment, the device 10 comprises a laser 12 (or other quantum phenomena generator) to generate photons. The laser 12 produces photons according to a Poisson process having nearly constant or sufficiently slowly or sufficiently rapidly varying (roughly cyclical) Poisson rate relative to a certain specified or adjusted time period(s) associated with the detection and recording process. In particular, if the Poisson rate is non-constant, it varies sufficiently slowly relative to both the time periods T1 and T1+T2+T3 , or sufficiently rapidly relative to the time period T1.

Note that photons are a convenient quantum media and can be easily produced. Any common light source may be used to generate photons, but a laser or tungsten filament with a direct current power source (Tungsten is a heat conductor and can be heated by passing an electrical current through it, in one embodiment.) is more likely to produce a constant, even flow of photons. An alternative embodiment could use any source of any kind of photons with a frequency high enough to be detected by the photon detector used. Such a source would preferably operate so that the registered detection pulses during the T1 detection intervals occur as a roughly Poisson process with nearly constant or sufficiently slowly or rapidly varying roughly cyclical rate. Most lasers produce a great many photons. Other photon generators could include, for example, an LED, or a source of x-rays satisfying Poisson process and rate conditions, or possibly a scintillation device. Single photons can be produced using a spectrometer or an ultra-high frequency helium-neon laser. (There may be some unwanted periodicity in the photon output of the latter photon source. Nevertheless, if the cycle time of the generator is short enough relative to the T1 time period associated with the detection process, or else is essentially perfectly synchronous with it, the registered detection pulses during the T1 time interval will constitute a (roughly) i.i.d. random process and thereby be capable of generating high quality random bits).

Also, even if these latter two devices produce a single photon virtually on demand (and so, by the way, require no attenuation), the randomness of the quantum detection process will convert such an ostensibly deterministic emission scheme into a random registered detection pulse process. To produce i.i.d. random bits, the emission times are synchronized with the T1 and T1+T2+T3 time periods and regulated so that virtually the same number no of emissions (or, rather, emission arrivals) occur during each successive T1 time period. If the detector then produces a registered detection pulse with probability $P_0$ from receipt of a single photon, the probability of generating a zero bit by this embodiment is (essentially) $(1-P_0)^{n_0}$. Ideally, such a $P_0$ should be coordinated with $n_0$ so that this probability equals (roughly) one-half.

It should be understood that the random number generator also could be constructed using a generator of other kinds of quantum phenomena. For example, any source of electrons, such as cathode emissions of electrons, could be used. Again, such a source would preferably operate such that the detection pulses that are registered satisfy various Poisson process and rate conditions. An alternative embodiment comprises a cathode emitter for generation of free electrons. In one embodiment, a one milliwatt helium-neon laser 12 is used to generate approximately $3 \times 10^{15}$ photons every second. The laser 12 has the additional advantage of not being acutely sensitive to minute fluctuations in surrounding electromagnetic fields. Despite any such fluctuations, the laser will probably generate a satisfactorily uniform output of photons.

To utilize the random occurrences of photons, the number of photons produced by this laser is attenuated. In another embodiment, a spectrometer is used to generate single photons, and no attenuation may be necessary. But, in one embodiment, photons are attenuated using an assembly of neutral density filters 14. Given the generation of approximately $3 \times 10^{15}$ photons by the laser 12, neutral density filters 14 with a combined optical density of 10.3 achieve an attenuation factor of $5 \times 10^{-11}$ to reduce the photon output to an average number of 150,000 photons every second with a mean distance between photons of 2 km. This attenuation factor is achieved via reflection and absorption, with the optical density D of the neutral density filters 14 defined as $$D = \log_{10}\left(\frac{I_o}{I_r}\right),$$

with $I_O$ representing the incident intensity of the light while $I_r$ represents the transmitted intensity of the light. The attenuation factor is reached in one embodiment using an assembly of two neutral density filters each having an optical density of 5.0 and a third filter having an optical density of 0.3, such as are available from Reynard Corporation of San Clemente, Calif. Any other combination of neutral density filters achieving the requisite attenuation could be used, provided that multiple reflections are not permitted to occur (or are inconsequential) between the individual filters. For example, in another embodiment, five neutral density filters each having an optical density of 2.0 are used in combination with a neutral density filter having a 0.3 density. Any optical filters capable of attenuating the photons from the generator to the requisite degree could be used. In one embodiment, multiple plate polarizers achieve the same attenuation factor as achieved using the neutral density filters. In fact, multiple plate polarizers can be used to greatly vary the degree of attenuation. Because their rate of attenuation varies with orientation, multiple plate polarizing filters, used alone or in conjunction with neutral density filters, can be used to provide a highly adjustable degree of attenuation (via rotation) not available by use of neutral density filters alone.

Highly adjustable attenuation may also be achieved by use of a darkened liquid or gas located between the photon generator and the detector, assuming that the light source is secured to a track mechanism, in one embodiment, so that its distance from the detector can be adjusted by some suitable mechanism (e.g., knob, dial, etc.). The liquid or gas is sealed off from these devices as well as from the external environment. Moreover, to prevent damage should leakage occur, the liquid should be chosen to be something which evaporates at ambient temperature (such as alcohol impregnated with ink or an ink-like substance, or even water in which potassium permanganate and possibly other substances are dissolved).

Letting $a_w$ denote the length of liquid or gas between photon generator and detector which can achieve a reduction in photons entering the detector by a factor of 10, for a given wavelength of light w, a volume of such darkened liquid stretching out $da_w$ units between the generator and the detector gives an attenuation factor of $10^d$ for wavelength w.

Varying the distance between the light source and the detector varies the length of liquid between the two and hence the degree of attenuation achieved. Controlling entry to the detector (and/or exit from the photon or quantum event generator) by an abutting pin-hole aperture can also provide much attenuation, possibly in conjunction with one or more successive convex mirrors (or even darkened spherical surfaces) of variable in between distances and suitably arranged light-blocking panels. In the embodiment wherein free electrons are generated, a thin metal plate having applied to it a constant source of electric charge in a vacuumed housing can attenuate the electrons.

As shown in FIG. 1, the photons transmitted from the neutral density filters 14 are detected using a photomultiplier tube 16 such as manufactured by Hamamatsu Corporation of San Jose, Calif. In one embodiment, the photons generated by the laser 12 have a wavelength of 632.8 nanometers. The photomultiplier tube 16 is capable of detecting photons of that specific wavelength. In one embodiment, the photomultiplier tube 16 is able to detect a single photon with non-negligible probability. The photomultiplier tube has a detection efficiency of 0.2. It is assumed that this means (or else the number 0.2 is replaced by the number which does have this meaning) that when an isolated single photon from the given laser enters the detector, it has probability 0.2 of generating a registered detection pulse. It can be appreciated that any photo detector capable of reliably detecting a single photon could be employed in place of a photomultiplier tube, bearing in mind that different photo detectors will have different levels of detection efficiency. In an alternative embodiment, an avalanche photo diode may be used instead of the photomultiplier tube 16. In other embodiments, charge-coupled devices might be employed to detect low photon levels. In one embodiment based on generation of free electrons, an electron multiplier tube acts as the detector.

Treating the neutral density filters 14 quantum mechanically, one can imagine that each photon emitted by the laser 12 and directed toward the neutral density filters 14 behaves independently of any prior photons and each has an identical positive probability $P_f$ (assuming that all of the photons have the same wavelength) of passing through the filters 14 and emerging on the other side, from whence it enters the photomultiplier tube 16 (or other detector). Note that $P_f$ may depend upon the wavelength of the photon. The detector itself acts as another re-sampler and re-randomizer, detecting each photon (or quantum event) it receives by outputting a registered detection pulse with probability $P_d$ (which could vary with the wavelength of the photon), independently of the past (assuming the detector has had time to re-equilibrate) and of the attenuator, etc. Hence a photon emitted by the laser 12 generates a registered detection pulse with probability $P_f P_d$. If n photons are emitted by the laser 12 during a time interval of length L, the probability that these do not result in a registered pulse is $(1-P_f P_d)^n$. Letting ln (x) denote the natural logarithm of x, the n which makes this probability nearly ½ is obtained by setting $n=-\ln2/\ln(1-P_f P_d)$, which is approximately $\ln2/(P_f P_d + (P_f P_d)^2/2)$. In one embodiment, $P_f$ is approximately $5 \times 10^{-11}$ (assuming that $P_d$ is approximately 0.2). (Of course one could adjust $P_f$ to compensate in case $P_d$ had a different actual value.) Since ln2 is about 0.7, it follows that if the T1 time interval may be set so that during such period the laser emits about $n=7 \times 10^{10}$ photons, then the probability of no registered detection pulse during such time period is approximately ½. In one embodiment, the laser 12 emits about $3 \times 10^{15}$ photons per second. Hence the T1 time interval should last about $7/3 \times 10^{-5}$ seconds, for the probability of no registered detection, plus perhaps an additional twenty nanoseconds or so (and it could be much less in some embodiments) for the duration of a registered pulse, because the probability of no registered pulse during a T1+T2+T3 detection and recording cycle should be approximately ½ (although this could be modified should other probabilities be desired). It should be pointed out that the nature of the randomness within the T1 time interval as well as between successive T1 intervals depends primarily on the emission stream of photons from the laser (or whatever process was responsible for generating the photons or other quantum source), and secondarily upon the attenuation and detection processes.

As generally shown in FIG. 1, at the beginning of a detection and recording cycle, the flip flop 18 is to be found in the zero state. Upon a registered detection of a photon or multiple photons during the initial T1 time period, the photomultiplier tube 16 or other detection apparatus creates a suitable electronic pulse which is transmitted to the flip flop 18, changing its state to one if it was zero, and leaving it in the one state otherwise. Regardless of whether a registered pulse has occurred, the flip flop 18 is read at the end of a T1 time interval (as measured by a first clock) and its state transmitted to a shift register 20. The flip flop 18 is then reset back to the zero state and after the passage of a total elapsed time of T1+T2+T3 time units since the start of the current detection and recording cycle (as measured by a second clock) another such cycle is begun, starting with a T1 detection period. The first and second clocks may be the same or different, but synchronized. In one embodiment, the second clock tracks the successive T1+T2+T3 time intervals. The shift register 20 shifts every T1+T2+T3 time units.

In other embodiments where there is pulse amplitude monitoring of the PMT output waveform and/or the associated detector deposition channel(s), the rate and time at which the bit shift register shifts is altered accordingly, or else the bits produced undergo a corresponding modification. In one embodiment, T1 is about $(7/3) \times 10^{-5}$ seconds. It is well known how to measure much shorter temporal intervals, such as nanoseconds ($1 \times 10^{-9}$ seconds). It is expected that the T2+T3 time interval be sufficiently longer than the fall time of the detector, as well as the duration of a registered pulse. The value of T2 and T3 depend upon the electronic equipment but are presumed to (typically) be of much shorter total duration than T1 (though this is not essential). Hence, in this case, the shift register 20 collects a sequence of zeroes and ones at the rate of roughly 43,000 per second. If, in addition, the photons emitted by the laser 12 constitute a (roughly) constant rate Poisson process, then, also assuming that the duration of a registered pulse is of lower order than T1 , the registered detection pulses will also be (very closely approximated by) a constant rate Poisson process, in which case, (whatever the T1 time period) the output stream of zeroes and ones will nearly be an independent and identically distributed sequence of random variables. Then, if the T1 time period is set properly (as previously discussed), the ones and zeroes produced by the shift register will be (roughly) equally likely, each having probability ½ of occurrence. Moreover, the T1 time period, as well as the photon output of the laser 12 (or other generator of photons or quantum phenomena), the attenuation factor of the neutral density filters 14 (or other attenuation assembly), and/or the detection efficiency of the photomultiplier tube 16 (or other detector), can be adjusted to produce virtually any other desired proportion (i.e., probability) of ones.

Frequently, there is a lack of constancy in the photon (or quantum) emission rate of the laser (or other generator of quantum phenomena) caused by the periodicity of an alternating current power source and resulting in a periodic ripple in the number of photons produced (of period possibly equal to one-half the cycle time of the alternating current). For this reason, a direct current or sufficiently high frequency power source might be used. This could also be augmented and compensated for by von Neumann's data analysis technique (at the cost of a factor of about four in the bit rate whenever the proportion of ones is initially between 40% and 60%).

To properly analyze the degree of randomness of the bits produced by, say, the cycling pair of time intervals T1 and T1+T2+T3 when used in conjunction with a flip flop bit generation device, let us let N(t) denote the random (presumably, and for simplicity and ease of analysis) Poisson process which represents the successive emission times of photons (or quantum events) from the photon source which actually enter the detector and generate a registered pulse. Thus, letting $$\tau_0=0, \tau_1=\inf\{t>0: N(t)=1\}$$

and, more generally, for each k1, letting $\tau_k=\inf\{t>0: N(t)=k\}$, then $$\tau_k-\tau_{k-1}$$

is the elapsed time between the $k-1^{st}$ and $k^{th}$ such photon emission. Unfortunately, the detection system does not preserve these emission times, the reason for this being that the transit time from the photon source to the first stage of the detector is not quite deterministic, and secondly, but far more importantly, a photon arrival which is sensed will generate a whole cascading barrage of electrons on the final plate (of the photomultiplier tube, for example) and these will occur at a variety of times, thereby smearing out the information concerning the generating photon's actual emission time. Let $(F_k, L_k)$ denote respectively, the elapsed time from the emission of the $k^{th}$ detected photon until the first generated electron hits the last plate, and until the last generated electron hits the last plate. Then, ignoring dark current, the generation of a registered detection pulse will be based on what happens during the time interval $[\tau_k+F_k, \tau_k+L_k]$. It is conceivable that two or more of these intervals would intersect. (This problem is further compounded and of increased likelihood due to the time it takes for such electrical charges to dissipate.) Indeed, this will happen frequently unless $E(L_1-F_1)$, the expected value of $L_1-F_1$ (and so of $L_k-F_k$), is of lower order than $E \tau_1$, the expectation of $\tau_1$. Such an overlap of intervals will not only make pulses difficult to separate, it may cause the affected (nearby) bits to be dependent.

Therefore, if $E(L_1-F_1)$ is of the same order of magnitude as $E \tau_1$ or larger, to generate a stream of independent bits, it would seem necessary to do at least one of two equivalent things: either increase the duration of the T2+T3 time period so that $E(L_1-F_1)$ is sufficiently smaller, or replace the originally generated bit stream $Y_1, Y_2, \ldots$ by the bit substream $Y_m, Y_{2m}, Y_{3m}, \ldots$ for sufficiently large m. (Note: there is nothing that can be done with the T1 time period because T1 is fixed at a value of roughly 1n2 times $E \tau_1$ possibly plus a certain (to be chosen) fraction of the average duration of a registered pulse). Alternatively, the pulse amplitude of the detector (and possibly also, at the same or somewhat later time, the prospective pulse deposition channel) could be monitored at the time of or just prior to the potential beginning of a T1 time interval to determine whether the pulse height (pulse amplitude) was at a "resting level", as discussed above. This latter approach would presumably provide a very reliable method of generating independent bits.

Whenever the PMT or other detector puts out signals that must be further amplified and/or modified to produce bits, the detector pulse waveform may be further smeared out. The buffering, multiplexing, and/or pulse amplitude monitoring system proposed is designed to maintain the integrity (separation and unicity) of registered detection pulses and to inhibit or prevent amplified versions of virtually any pulse waveforms from the detector from overlapping and piling up, thereby inducing false readings.

Feedback System for Regulating the Power Supply

Moreover, despite all efforts to prevent it, there may be some inevitable variation in photon (quantum) emission rate or even detection rate from any light (quantum) source or detector due to power line voltage fluctuation, heat buildup, electrical contact fluctuation, aging, photomultiplier tube dynode plate voltage instabilities, thermal changes in the environment, etc. However, the registered detection pulses themselves (of single photon or single quantum events, in most embodiments) can be used to monitor the variations in photon (quantum) emission and/or registered detection rate and thereby keep things properly regulated, maintaining a generally stable flow of registered photon (quantum event) detections without significantly impinging on the capability of the system to produce nearly truly random numbers (bits). One simple way of doing this is to fix an integer $n^*$ (say $n^*=40{,}000$ in one embodiment) and fractions $0<\gamma_0<\gamma_1<1$ (say $\gamma_0=0.49$ and $\gamma_1=0.51$, in one embodiment) and let $W_n$ denote the number of ones among the last $n^*$ bits produced by the device (such as by the flip flop and shift register) (before any von Neumann data manipulation of the bits or the like) up to and including the $n^{th}$ bit. If $W_n \leq \gamma_0 n^*$, marginally increase the power to the photon (quantum) source. If $W_n \geq \gamma_1 n^*$, marginally decrease the power. Otherwise, the power should be left alone. Moreover, if the power has just been adjusted, it should not be readjusted until a least some reasonable fraction of $n^*$ additional bits have been produced. For improved reliability and performance, the fractions should be chosen so that $\gamma_0 < P^* < \gamma_1$, where $P^*$ is the desired proportion of ones in the bit stream, and also, $\gamma_1-P^*$ and $P^*-\gamma_0$ should probably be about equal, and $\sqrt{n^*}$ times min $\{\gamma_1-P^*, P^*-\gamma_0\}$ should probably be approximately 4 (somewhere between, say, 2 and 10 is probably most desirable) times $\sqrt{P^*(1-P^*)}$. The marginal changes in the power supply might be of order 0.01% of the current power supply level, but should not exceed a proportion of max $\{\gamma_1-P^*, P^*-\gamma_0\}$ in most embodiments. (As an alternative or adjunct to adjusting the power supply, one could also adjust the length of the T1 detection period.) Note further that whenever the primary photon (quantum, etc.) emission surfaces are not electrically activated, then their total emission rate probability needs to be made adjustable by some electromagnetic or electromechanical (or possibly piezo-electric) means, which could involve something as simple as varying the exposed area of such surfaces. Note that for any two real numbers a and b with $a \leq b$, min $\{a,b\}=$min$\{b,a\}=a$ and max $\{a,b\}=$max $\{b,a\}=b$.

Fortunately, even though the laser's (or other photon generator's) photon emission rate will not be perfectly constant, and neither will the detector's detection rate or pulse waveform distribution, very nearly ideal random numbers can still be produced if the probability of no registered detection pulses changes very slowly from one T1 time period to the next. From our earlier analysis it is clear that this condition will be satisfied if the actual number of photons emitted by the laser does not change by more than say, 1%, from one T1 time period to the next (with high probability). This condition will in turn be satisfied if the laser's emission rate is periodic and cycles with sufficient rapidity relative to T1 or if the laser's emission rate never drops too near to zero and simultaneously cycles sufficiently slowly relative to both T1 and T1+T2+T3 time periods and if the photon (quantum) source is being constantly properly regulated.

From a sequence $Y_1, Y_2, \ldots$, of ones and zeroes which are independent (or nearly so) and are biased or have slowly changing probability of being zero, one can select a subsequence which very nearly does meet quite rigid standards of providing essentially independent identically distributed (i.i.d.) random numbers with essentially equal probability of ones and zeroes. The method, due to John von Neumann in 1951, is as follows:

Let $Y_1, Y_2 \ldots$, denote the sequence of ones and zeroes produced by the shift register (in one embodiment). Group the sequence into disjoint adjacent pairs $(Y_1, Y_2), (Y_3, Y_4), \ldots$ Eliminate all pairs with identical entries $(0,0)$ or $(1,1)$ and retain only the first component (or only the second component, or alternate which is retained, etc. More generally, retain exactly one of these two components based on any rule which makes its selection independently of the value of either component) of the other pairs. This gives a sequence $X_1, X_2, \ldots$ which is a subsequence of the original $\{Y_j\}$ sequence but which is much more nearly truly random because (for all $j \geq 1$), $P((Y_{2j-1}, Y_{2j})=(1,0))$, the probability that $Y_{2j-1}$ equals one and $Y_{2j}$ equals zero, is essentially equal to $P((Y_{2j-1}, Y_{2j})=(0,1))$, the probability that $Y_{2j-1}$ equals zero and $Y_{2j}$ equals one. Since the $\{Y_j\}$ are assumed to be essentially independent, the conditional probability that $Y_{2j-1}$ equals (say) zero, given that $Y_{2j-1} \neq Y_{2j}$ and given $Y_1$, $Y_2, \ldots, Y_{2(j-1)}$ is essentially equal to $P(Y_{2j-1}=0$, given $Y_{2j-1} \neq Y_{2j})$, which is nearly one-half. Thus, even if the $\{Y_j\}$ are inherently or recurrently biased toward one or zero, that bias is essentially absent in the $\{X_k\}$ sequence.

One embodiment of the random number generator as described is capable of producing about 43,000 random numbers per second, assuming the von Neumann procedure is not used. Moreover, adjustments can easily be made to increase the number of photons transmitted through the neutral density filters 14 by either increasing the power of the laser or by decreasing the net attenuation factor of the neutral density filters. Photomultiplier tubes are available which can produce registered detection pulses based on detection of single photons perhaps as frequently as 100,000,000 per second or so if registered detection pulses are short enough in duration. Dividing this number by ln2, it may therefore be possible to produce as many as 140,000,000 random numbers per second using the same basic configuration as shown in FIG. 1, with the possible addition of a multiplexor, multiple deposition channels, etc. This rate of production is more than sufficient for all but the most demanding applications for random number generators using only a single device 10. For scientific calculations or other applications demanding billions of random numbers, several of the device 10 can be combined each of which is capable of producing as many as 140,000,000 random numbers per second. In an alternative embodiment, an avalanche photo diode is used which is capable of detecting in excess of 1 billion single photons per second with a flip flop(s), clock(s) and shift register (together with any other necessary electronics) capable of recording in excess of 1 billion values per second.

Because of its basic design and regulatory (and/or von Neumann data analysis) components, the random number generator as described is less apt to be affected by changes in surrounding temperature and line voltage than other physical random number generators, giving it a stability allowing its use in a wide variety of applications.

In an alternative embodiment of the invention, the neutral density filters 14 are coordinated with the laser 12 to increase the average transmission of photons through the filters 14 by a factor of ten to the fifth power. This will result in about $\lambda_0 \equiv 1.5 \times 10^{10}$ photons departing the attenuator per second (with a standard deviation of order $\sqrt{1.5} \times 10^5$ photons). A photodetector is used which produces a registered detection pulse with probability $p_j$ if j photons enter the detector during a time of $10^{-2}$ seconds.

Let $q_j$ denote the probability that j such photons enter the detector during this time interval. Assuming that $q_j$ approximately satisfies the Poisson probability law with parameter $\lambda$, $$q_j = (\exp(-\lambda)) \frac{\lambda^j}{j!}.$$

The sum $$Q \equiv \sum_{j=1}^{\infty} q_j p_j$$

describes the probability that a registered detection pulse will be produced during this time interval from a $\{q_j\}$ photon arrival process and a $\{p_j\}$ detector process, as expressed in general form. If $p_j$ is near one-half for, say, $|j-\lambda| \leq 10\sqrt{\lambda}$, Q will be very close to one-half. If the photo-detector is of more threshold type, one might have, say, $$p_j = \frac{(s_j + s_{j-1})}{2},$$

where $s_0 = q_0$ and, for $j \geq 1$, $s_j = q_0 + q_1 + \ldots + q_j$. Then $$Q = \sum_{j=1}^{\infty} \left( \frac{s_j + s_{j-1}}{2} \right)(s_j - s_{j-1})$$

$$= 2^{-1} \sum_{j=1}^{\infty} (s_j^2 - s_{j-1}^2) = 2^{-1}(s_\infty^2 - s_0^2)$$

$$= 2^{-1}(1 - s_0^2).$$

Thus, by changing the $q_j$ a little bit further one can make Q equal to one-half. Alternatively, by increasing the laser's rate of photon emission by a factor of $(1-s_0^2)^{-1}$ (or adjusting the attenuator, etc.), Q can be made equal to one-half. For the example at hand, use $\lambda = \lambda_0$. Similarly to the one embodiment, if no registered detection pulse occurs during the interval of length $10^{-2}$ seconds (which is the setting of the T1 time period in this instance), a value of zero is assigned. Otherwise, a value of one is assigned. The assigned values are recorded in the shift register to produce a sequence of numbers $(Y_1, Y_2, \ldots)$. Assuming that the laser's photon output over disjoint $10^{-2}$ second time intervals is essentially independent and of nearly constant order of magnitude, the $\{Y_j\}$ will be an essentially i.i.d. sequence of ones and zeroes, with each $Y_j$ having probability Q of being equal to one. When Q is not equal to (roughly) one-half, this can be corrected to (roughly) one-half by the von Neumann method.

If there are difficulties in allowing photo-detection to occur over an interval of time as long as, say, $10^{-2}$ seconds, the detection period could be restricted to a sub-interval of, say, $10^{-k}$ seconds. Alternatively or jointly, the laser could be designed to send pulses in short i.i.d. bursts lasting about $10^{-k}$ seconds (for some $k \geq 3$) every $10^{-2}$ seconds.

However, it must be pointed out that random number generation based on this kind of batched detection system may be much more sensitive to changes in line voltage and device temperature than the single photon detection scheme. Fluctuation in photon emission rate and/or registered detection rate due to these or other causes may make reliable production of long strings of nearly random stationary equally likely binary bits difficult if not impossible to obtain or maintain without either reducing the number of photons in a batch or incorporating a sufficiently sensitive monitoring and regulatory feedback system to control the rate of photon emissions (which will have a minor impact on the degree of randomness achievable). As alluded to earlier, attenuation down to the single photon threshold detection case circumvents this problem. It may also be circumvented, however, if the detection probabilities $p_j$ are (sufficiently) bounded away from zero and one for, say, j between 0.9 $\lambda$ and 1.1$\lambda$, as this would allow for a ten percent fluctuation from the baseline photon emission (or quantum detection) rate.

When operating in somewhat hostile environments (e.g., certain computers, outer space, etc.), it may be necessary or desirable to shield the random number generator photonically, thermally, electro-magnetically, or from X-rays, gamma rays, cosmic rays, ions, etc. Conversely, it may be necessary to shield surrounding electronic or other equipment, devices, or people from the random number generator.

Moreover, it may also be desirable to make various components of the system utilizing compounds of zirconium tungstate, or the like, to ensure that key parts do not significantly vary in size as temperatures change due to use or environmental factors.

Black Body Sources

As opposed to a laser light source, which has the property that it emits a highly collimated beam of essentially monochromatic light (i.e., photons of a single wavelength), one could also generate photons by a thermally controlled blackbody type source. To do so, one could use a DC (direct current) power source equipped with a power supply (self-) controller to heat a vacuum enclosed tungsten filament, using the tungsten as a resistor in an electrical circuit in one embodiment, and maintain it at an approximately constant chosen temperature. The tungsten will approximate a black body cavity resonator, emitting photons of virtually all wavelengths from its surface at a rate roughly proportional to the black body rate with a tungsten specific characteristic proportionality constant which depends principally on temperature and wavelength. For each photon wavelength $\lambda>0$ and each absolute temperature T (measured in degrees Kelvin), the photon emission rate density at equilibrium is presumably a constant $r(\lambda,T)$ per unit surface area. One could potentially increase the number of photons emitted per second from a given piece of tungsten of a given temperature by drilling holes part-way into it (which may increase the rate of high energy photons emitted to an even greater degree, as the interior of the tungsten may be hotter than the exterior) or by otherwise increasing its effective surface area (such as by creating a long, stringy coiled filament, as is commonly done in a light bulb).

Tungsten is a good choice of material for an approximate black body photon source because of its high melting point (about 3410° Centigrade).

By varying its temperature between, say, 300° K and 1500° K, an appropriate sized piece of tungsten or tungsten filament should be able to produce a range of registered detection pulses which would certainly include the interval $[10,10^9]$ based on photon emissions having, say, wavelengths less than or equal to, say, 632.8 nanometers, without the need of an attenuator. (With corresponding changes in temperature requirements, other wavelength intervals could produce such detection rates.) Moreover, a prism could be used (not only as a flat piece of glass but also) as a mechanism for selecting the photons with, for example, shorter wavelengths. More simply, a color filter or tinted glass could be used to select for certain families of wavelengths. Shorter wavelengths could also be produced via a nonlinear optical crystal which induced second harmonic generation.

Per unit time per unit area photon emission rates from an ideal black body source from various collections of wavelengths can be calculated based on the energy $E_\lambda$ of a photon of wavelength $\lambda$ (recall that $$E_\lambda = \frac{hc}{\lambda}$$

applied to Planck's radiation formula for black body (cavity) radiation:

$$R_\lambda = \frac{C_1}{\lambda^5}\left(\frac{1}{-1+\exp(C_2/\lambda T)}\right).$$

Here h is Planck's constant, $\lambda$ is the wavelength of a given photon, T is the temperature in degrees Kelvin, $C_1=2\pi c^2 h$, c is the speed of light, $C_2=hc/k$, k is Boltzman's constant, and $R_\lambda$(known as the spectral radiancy) is the radiation density per square centimeter due to photon emissions of wavelength $\lambda$. For temperatures T in the range of roughly 500°–1400° K, an increase in Kelvin temperature by around 25° at the low end and 200° or so at the high end is required to increase the photon output (for a black body) of wavelengths at or below about 600 nanometers by a factor of ten. Therefore, for the tungsten source, it should be clear that the temperature required to produce photon outputs in the $[10,10^9]$ range can be readily calibrated. Furthermore, it should not be hard to maintain.

The heated tungsten would normally be installed in an evacuated transparent or tinted glass (or possibly heat proof plastic or other material) housing and located outside or even inside the detector. However, if it proved feasible or advantageous to generate random numbers from thermionic emission of electrons (with or without the concomitant use of photons), then it might be desirable to locate the tungsten (or other heating element) without its housing, but probably coated with some appropriate dielectric or semi-dielectric material of suitable thickness, inside the detector (such as inside the first chamber of a PMT (photomultiplier tube), or an EMT (electron multiplier tube), closed off from the external environment, assuming its heat and/or presence would not interfere with the functioning of the PMT or other detector. (Of course, the PMT could be cooled).

Because of the already present electric fields inside a PMT (or EMT), random number generation based on thermionic emission of electrons would seem to consume (much) less power (i.e., require lower tungsten (or other heating element) temperatures) at a given random number generation rate than one based on the photon emissions of the same piece of tungsten placed in an electron absorbing housing.

Ignoring its possible benefits as an electron source, a (variable magnitude) direct current powered tungsten light source provides a number of general benefits over the laser as a photon source for the purpose of generating random numbers (bits). For instance, there is no need for attenuation of photons because one generates only the amount needed. This will reduce cost, complexity, and the level of heat generation. Also, there is less need of precision alignment between light source and detector since the tungsten will radiate photons (and/or electrons) in a multitude of directions. Therefore, the photon generator does not need to be in such a rigidly exact alignment with respect to either the detector or any system of attenuation, as required by a laser. Furthermore, by employing a less collimated photon source, the detector should age more slowly because its plates would experience more extensive and uniform regions of use, greatly reducing consumer replacement cost.

Moreover, since photons of lower wavelength have more energy, they will typically produce detector pulses of greater amplitude. This opens the door to generating random bits at a higher rate from a black-body type photon source such as tungsten than a laser photon source since the laser produces a narrower distribution of amplitudes among the outputted detection pulses than a black body type source. The simplest way of accomplishing an improved random bit generation rate would be to select an integer k+1 and split the amplitude heights of the registered detection pulses into k disjoint categories, possibly allowing for an additional "no registered pulse" category. Ideally, the categories might be chosen so that a random registered detection pulse is (roughly) equally likely to belong to each of the categories. Categories consisting of single non-overlapping intervals can be constructed to (approximately) achieve this goal. In general, the widths of the intervals will be different from one another and require adjustment as the temperature of the tungsten or other black body type photon source changes. If one wants to use disjoint categories $C_1, C_2, \ldots, C_k$ of amplitudes of registered detection pulses for which both the average number of photons detected and the average energy of the imputed number of photon emissions from the tungsten (or whatever other black body type photon source is used) does not vary (to the relevant degree of approximation) from category to category, it should be possible to achieve this goal by means of 2k−1 disjoint intervals $I_k < I_{k-1} < \ldots < I_2 < I_1 < J_2 < J_3 < \ldots < J_k$ and categories of the form $C_1 = I_1$ and, for $2 \leq j \leq k$, $C_j = I_j \cup J_j$. (Given two intervals A and B of reals, A<B means that every real number belonging to the set A is less than every real number belonging to B.) Because the photon stream emitted by the black-body type source is a Lévy process, the registered detection pulses of each of the k separate amplitude categories constitute independent (roughly) Poisson processes (ignoring the dead time of the detector and the pulse widths). Therefore, by recording the amplitudes of successive registered detection pulses, separating them into k categories, possibly allowing for an additional "no registered pulse" category, generating random bits based on the category assigned and its Poisson-governed arrival times, more bits can be generated than if one merely lumped all detection pulses into a single category, thereby ignoring (except for the possible requirement that all the amplitudes exceed some defined and chosen threshold or belong to some interval) variations in their amplitude. By also keeping track of the arrival times, pulse height durations and/or oscillations, etc., even higher random bit rates can be achieved.

It should be possible to identify pulse waveforms typical of "dark counts" so as to define the notion of a registered detection pulse so as to exclude possibly the vast majority of these frequently unwanted signals, possibly primarily retaining only those whose probability distribution is governed by an independent Poisson or Lévy process.

Figure 2:
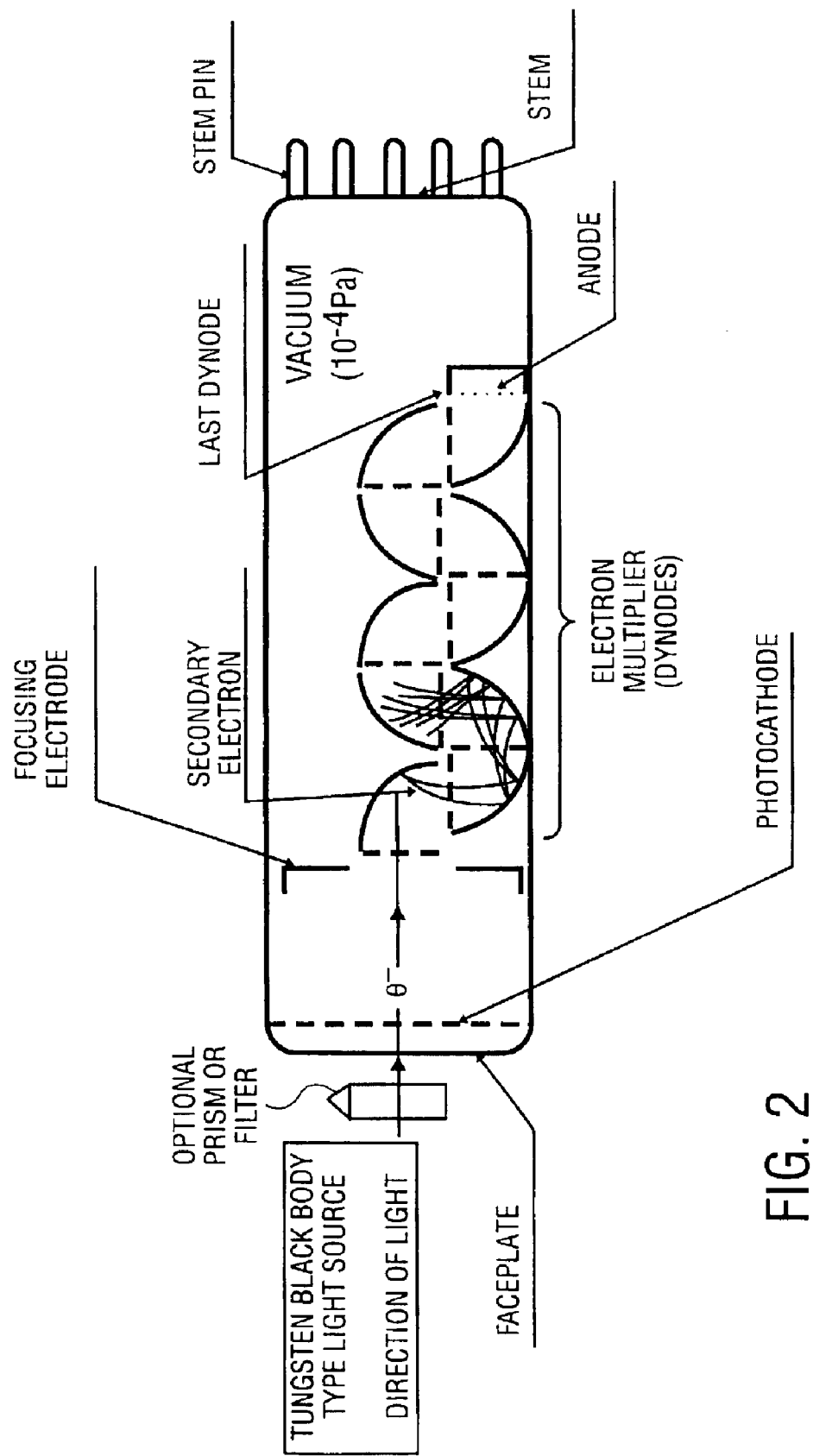
FIG. 2 illustrates one embodiment of a random number generator having a black-body type of source.

FIG. 2 illustrates one embodiment of a random number generator having a black-body type of photon source. Referring to FIG. 2, a tungsten black body type light source is shown coupled to a photomultiplier tube. An optional prism, filter or tinted glass may be coupled between the black body light source and the photomultiplier tube. In order to avoid obscuring the invention, a DC power supply, electronics of the recording system and the monitoring system have not been shown.

Use of Dark Counts as a Source of Random Registered Detection Pulses

The electrical current output and waveform of a photomultiplier tube (or other quantum phenomena detector) will be affected not only by the photons or other quantum phenomena intentionally sent into it, but may also be affected by the detector itself, with its electronic and molecular processes (quantum and otherwise) acting inside it, together with the intrusion of various external events such as cosmic rays and internal or ambient temperature. The current output from unintended sources (as typically measured by sealing off photonic entry to the PMT) is referred to as "dark current".

Generally, there are about six categories of causes of so-called dark counts (or dark current) within a photomultiplier tube (including thermionic emission of electrons, leakage current, glass scintillation, field emission current, ionization current due to residual gases, and other noise current). To a substantial degree, restricting the registered detection counts to pulses of some minimum amplitude or some interval of amplitudes and/or amplitude interval durations, etc., based on the photon wavelength distribution (or quantum event distribution) from the light source (or quantum event generator) may restrict the rate at which registered detector pulses derive from the dark counts. Moreover, to the extent to which such amplitude and/or waveform constraints permit the receipt of dark counts which constitute a Poisson or Lévy process which is independent of the (presumably) inputted photon (quantum) process, the dark counts themselves may contribute constructively to the generation of random numbers (bits). In fact, if the rate of production of random numbers from dark counts is high enough for the needs, and considered suitably random, no input photons or other quantum phenomena would be necessary, since all the random numbers could be generated from dark counts. Closing off the PMT (or other detector) photonically and possibly removing or replacing the photocathode plate, as discussed momentarily, one could readily generate about 1000 registered detection pulses per second from dark counts, with an appropriate choice of a PMT. At room and surrounding temperatures, the probability of electron emission per unit surface area varies among different materials over a huge range encompassing very many orders of magnitude (copper and silver being near the high end, silicon being near the middle, and fused quartz and diamond at the bottom). As a result, and considering the electric fields present, a grounded conducting plate of suitable surface area with a thin coat of suitable composite material can be constructed to provide thermionic electron emission at ambient temperatures at virtually any fixed desired rate from one to $10^9$ counts per second when located strategically in the first chamber of a (possibly somewhat modified) PMT or EMT (or other detector).

Somewhat less desirably, the number of such dark counts, and hence the number of registered detection pulses derived therefrom, could also be increased by heating part or all of the initial chamber of the PMT (or other detector) (such as by introducing a possibly coated tungsten or nichrome wire segment or other heating element at a strategic location in this region). Perhaps more favorably, one might introduce into the first chamber a grounded, partially exposed, sharp metal object such as a needle (or possibly many needles, even an entire array). In the presence of a positive electric field on the first (dynode) plate, electrons would presumably be pulled off a nearby needle tip at Poisson rate. This rate would depend on various aspects, such as the needle's metallic composition, its thickness, its sharpness of tip, any coating, its composition and thickness, temperature and electric field near the tip (as governed by things such as the voltage on the first plate, the plate's size, the needle tip's distance from it, etc.). Ideally, this would produce registered detection pulses at the desired rate. If, however, too many electrons were emitted by the needle per second, the rate could be reduced to virtually any desired amount by coating the needle with an appropriate material (pure or composite) of suitable thickness (thinness) and electron emission probability. Also, if the rate of electron emission needed to be increased, a suitable (roughly) constant negative voltage (monitored and regulated) could be applied to the needle. (Less desirably, more needles could be added.) The resultant large negative electric field near the tip of the needle would then also rapidly accelerate the speed of any electron it emitted, thereby (possibly greatly) increasing the number of secondary recoil electrons produced when such an initial electron impacts the first PMT (or EMT, or other detector) plate (which is now a positively charged dynode plate rather than a photocathode plate). The monitoring and regulation of such a voltage or other power supply could be based on the number of ones produced by the detector among the last n* bits, as described more fully earlier. Moreover, because gold is so good at uniformly diffusing heat, as well as conducting electricity, it might be desirable to sputter a thin gold film (or possibly silver, in some embodiments) on the (perhaps, but not limited to, iron, steel, copper, brass, tungsten, nickel, chromium, or some alloy thereof) needle tip, whether or not a (relatively) electron emission inhibiting coating is also then used.

Presumably, the choice of metallic composition of the needle and any coating would be affected by the temperatures generated at its tip, as well as the anticipated internal and external electric fields therein and nearby, together with the desired rate of electron emission.

If the polarity on the needle tip is (sufficiently) reversed (i.e., made sufficiently positive), the intense field at the tip of the needle could strip off one or more electrons of any hydrogen, helium, nitrogen or possibly any other gas, atom or molecule present inside the photomultiplier tube (or other detector) which happened to hit the needle tip or happened to arrive in sufficient proximity thereto. The positive ion so formed would then be repelled by the needle and its surrounding positive electric field and be accelerated toward the first plate (normally called a dynode) inside the PMT or other detector. By making its voltage negative, this plate could contribute to the acceleration of the positive (preferably helium or nitrogen) ion. As usual, all subsequent dynode plates would be set at positive and successively higher voltages in order to accelerate the successively produced free electrons toward the successive dynode plates. Regarding any photocathode or negatively charged plate as the first plate and the first positively charged dynode plate as the second plate, the possible virtue of this design over the photon detection designs discussed previously is that whereas there is typically only about one (on the average, its a fraction) electron produced at the first (photocathode) plate, in this instance there would be some number n, where n depends on the energy with which the positive ion, which then becomes neutralized, hits that plate. Consequently, the amplitudes of the current from the last plate would also be multiplied by an average factor of n. Moreover, because the subsequent dynode plates are all increasingly positively charged, the introduction of a positively charged needle(s) followed by a negatively charged first plate need not increase the maximum applied voltage's deviation from zero.

Figure 3:
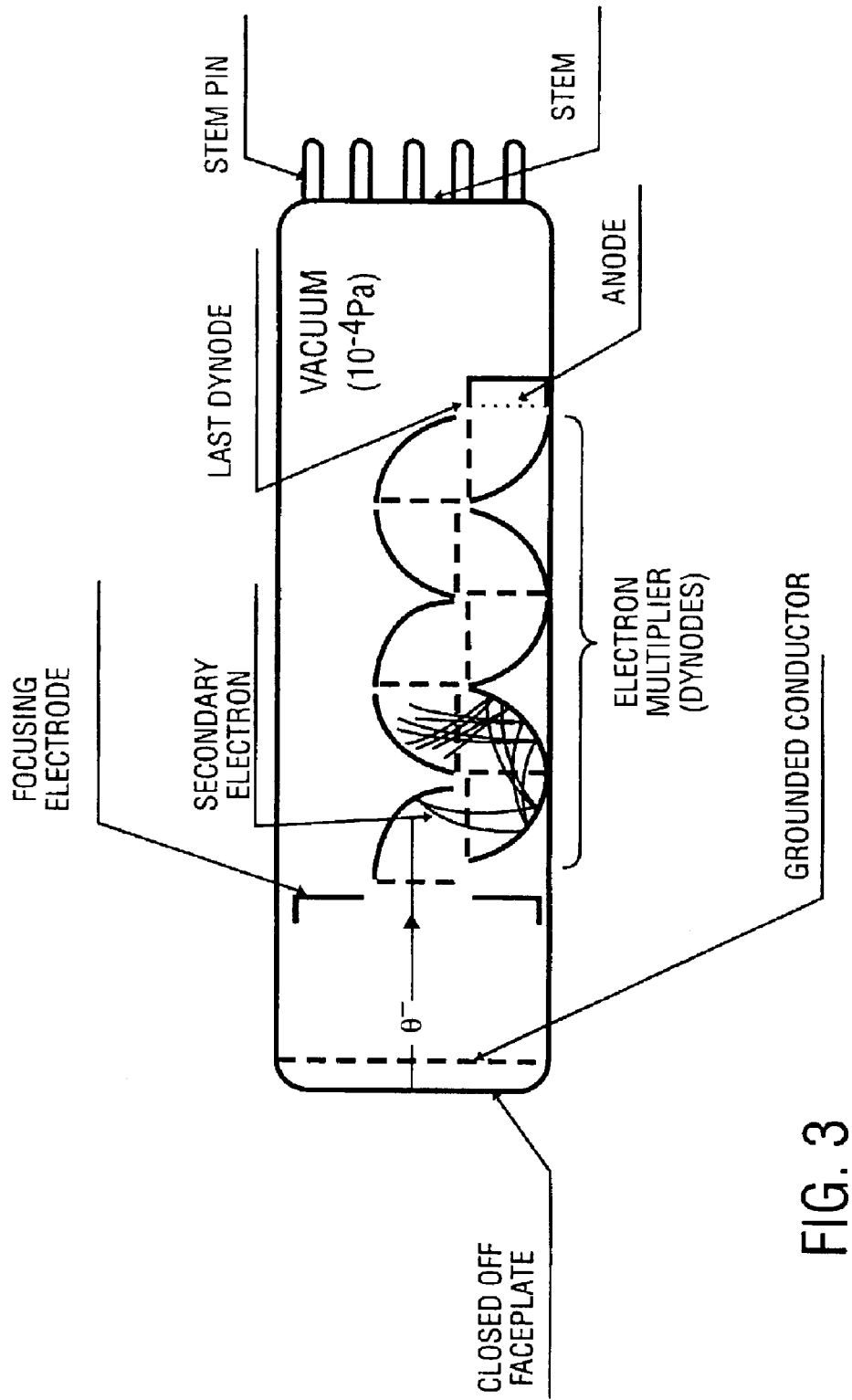
FIG. 3 illustrates one embodiment of a random number generator that uses thermionic emission of electrons.

FIG. 3 illustrates one embodiment of a random number generator that uses thermionic emission of electrons. Referring to FIG. 3, a photomultiplier tube has a closed off face plate. The photomultiplier tube also includes a properly grounded conductor coated with material of appropriate electron emission probability located at the point near the closed off end of the tube or closer to the dynodes. Again, the DC power supply, electronics of the recording system and monitoring system are not shown to avoid obscuring the present invention.

Figure 4:
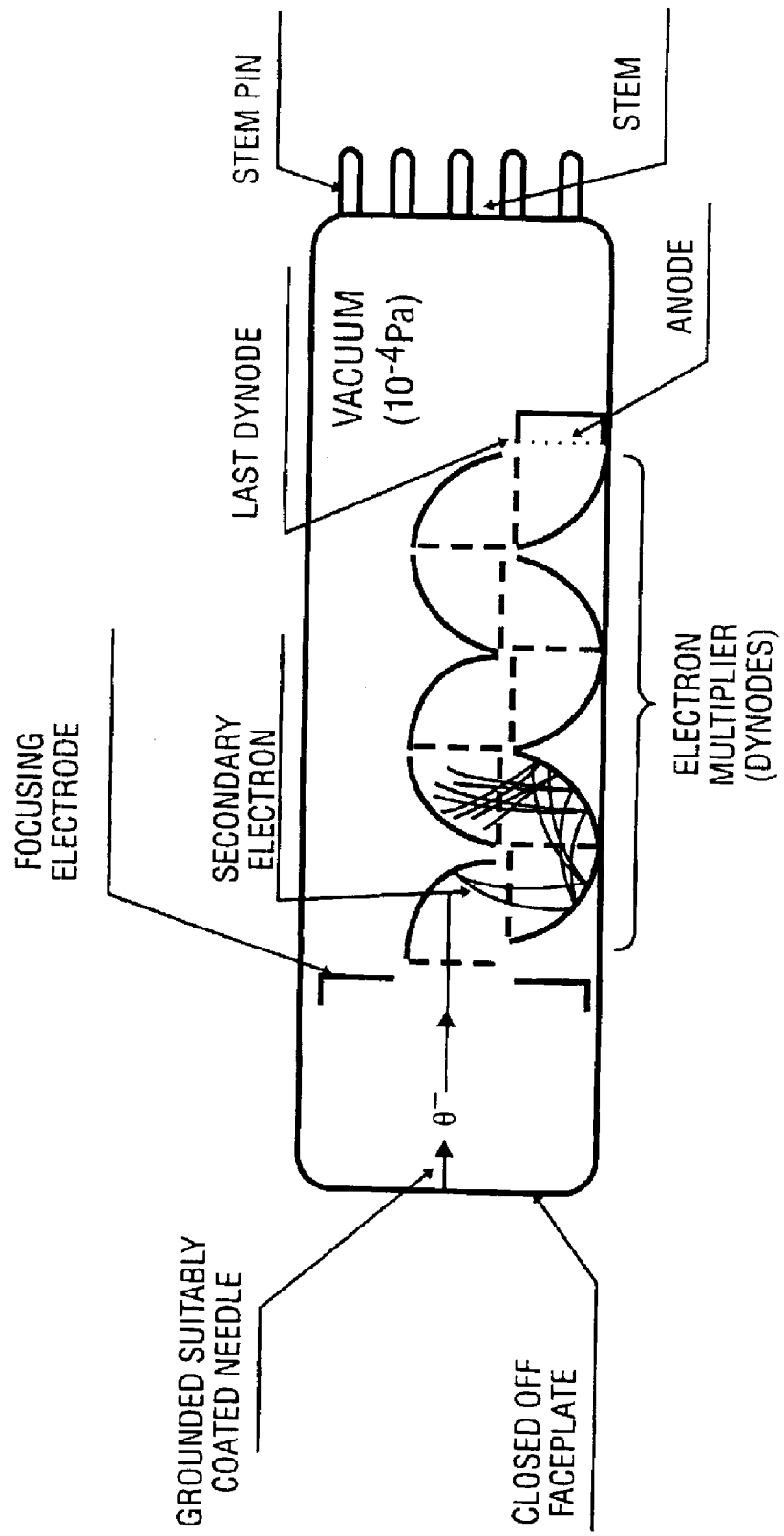
FIG. 4 illlustates one embodiment of a random number generator having electron emission from a needle.

FIG. 4 illustrates one embodiment of a random number generator having electron emission from a needle. Referring to FIG. 4, a photomultiplier tube with a closed off face plate is shown. A grounded and suitably coated needle, possibly at a constant negative voltage, is located inside the photomultiplier tube at a suitably chosen distance from the first dynode plate. Again, the DC power supply, electronics of the recording system and the monitoring system have not been shown to avoid obscuring the present invention.

By controlling the amount of helium, nitrogen, and other gases inside the modified PMT (or other detector) and/or the number of needles (more (positively charged) needles are advantageous in this case and can compensate for fewer gas molecules) and their tip sizes, one could control the rate at which the movements of the electrically neutral, uncharged gases (often modeled as driftless homogeneous Brownian motion processes) would cause them to hit the needle tip(s), thereby producing what should be a highly random succession of output pulses, without affecting the performance of the dynode plates, relying as they do on a highly evacuated environment. Moreover, since the modified PMT or EMT (or other detector) is to be closed off, it can be housed in another container so that it need not be subject to the entry of helium gas diffusing from the outside air in through the glass and into the interior of the detector. By controlling the size of the needle tips, their positive voltages, and the (negative) voltage on the first plate, perhaps it would be possible to make n, the number of recoil electrons from the first (negatively charged) plate, as large as 100 or 1000 or more, in which case the electronics of random number generation would be capable of greater speed, simplification and/or safety, as either fewer further pulse amplification steps would be necessary or lower maximum PMT voltages could be used.

By selecting appropriate materials of an appropriate size (and thin-ness), suitably well grounded, on or near or in place of the photocathode plate, one could theoretically produce random bits via thermionic emission of electrons at room temperature (and/or a broad interval of surrounding temperatures) from a relatively smooth surface at rates at least as high as $10^9$ per second (if the detector could handle such a rate) without the need of attenuation. If there were some question about slight correlations of temporally nearby electron emissions, one could consider only those pulses which occurred at least to time units after the last recognized detector pulse. In many embodiments, it is anticipated that $0 \leq t_0 \leq 10^{-6}$ sec. Since the temperature at which the device operates may change from use to use or even during use, the von Neumann technique might be used. Otherwise one may need to use a monitoring system to actively monitor and readjust for changing rates of electron emission, possibly cooling (or heating) the detector, changing voltages, etc.

Figure 5:
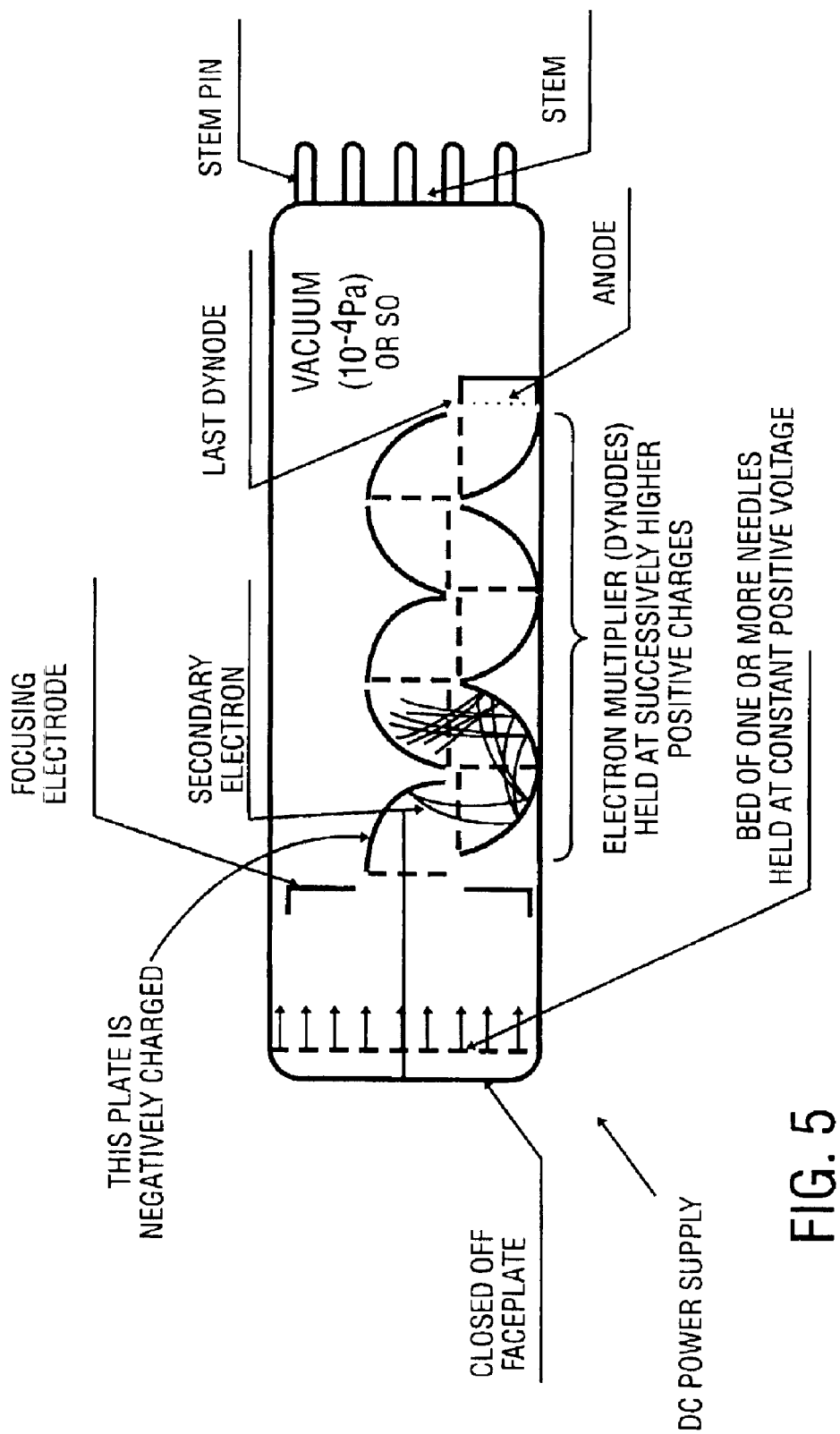
FIG. 5 illustrates one embodiment of random number generator that operates based on movements of gas molecules.

FIG. 5 illustrates one embodiment of random number generator that operates based on movements of gas molecules. Referring to FIG. 5, a photomultiplier tube is shown with a closed off face plate and is powered by a DC power supply. One or more needles are shown held at a constant positive voltage. The electron multiplier (the dynodes) are held at successively higher charges. The first of the dynode plates is negatively charged.

With respect to detectors in general, many types of detectors to obtain registered detector (or detection) pulse may be used. In one embodiment, the purpose of generating random bits (or random numbers), all that is required is that there results in the detector itself a (roughly) independent and identically distributed (i.i.d.) sufficiently non-constant random process. Thereby, (roughly) i.i.d. registered detection pulses will sometimes occur, and sometimes not occur. Furthermore, if such registered pulses are sufficiently different sufficiently often, their waveforms can be used to produce random bits at higher rates by splitting such pulses into k+1 mutually disjoint categories, C0, C1 . . . , Ck and outputting a distinct symbol for each category. (Category C0 is used to denote the "no registered detection pulse" category.) Such categories can be constructed based on pulse height alone, pulse duration alone, their joint behavior, or even progressively finer pulse shapes. The reason this observation is so liberating is that for each electronic device in each age of its technological advancement there is a natural order of magnitude of charge and/or voltage used in its typical circuitry. Therefore, it should often prove possible to select the i.i.d. random process to be monitored or the method of so doing to naturally and "automatically" produce detection pulses of just that appropriate order of magnitude, thereby not requiring major reprocessing or amplifying of the signals (electronic or otherwise) from the detector to inject random bits into the system. With this idea in mind, it should not be necessary to only send and detect single photons, etc. Large numbers of photons or other quantum phenomena could be repeatedly sent into any detector capable of converting them to nonconstant (roughly) i.i.d. random pulses. Random bits could then be produced therefrom as long as the detection pulse waveforms they produce are sufficiently different sufficiently often.

Random bits and random numbers can be sensibly produced in many additional ways. Several a listed below and very briefly discussed, each related in part to application of Heisenberg uncertainty principle.

One method involves using sufficiently collimated x-rays sent preferably roughly one by one into a crystalline atomic structure, such as salt (NaCl), at an appropriate angle to the molecular lattice to diffract off at a sequence of lesser principle angles according to a succession of decreasing probabilities. One or more detectors could be set up along such respective paths, producing bits based on receipt or non-receipt of a so-called registered detection pulse from a (so-called T1) detection interval of calibrated, possibly adjustable, length. As a refinement, one could gait the x-rays, keeping track of the analog or digitized time elapsed from the start of such a so-called T1 detection interval until first receipt of a registered pulse.

Even if the x-rays are being produced and sent into the crystal at a faster rate than desired, one can compensate for this by setting up the detector(s) along sufficiently low probability paths. Hence, no special attenuator is required as the detection angle automatically performs the needed attenuation. Moreover, since x-rays posses much greater energies than visible light, they should prove to be much less expensive to detect. On the other hand, if used near humans, a random number generator based on x-ray production and detection might necessitate shielding.

Another method is analogous to the first except that electrons are to be used, and the crystal lattice might be of, say, nickel. This device might require electromagnetic shielding from external fields. However, it would have the advantage of being operable over a very broad range of energy levels, making it somewhere between possible and quite likely that the optimal choice of electron energy for the application at hand would be generally desirable and competitive.

In another method, sufficiently collimated photons can also be diffracted by (and around) a one-sided boundary. Thus, if an opaque planar object having a straight, sharp edge (such as a razor blade) is slowly moved transversely into the path of a laser beam, it will both diffract and attenuate it. Once initially adjusted, the light-blocking blade could be positioned and re-positioned by a piezo-electric or other electro-mechanical device, with the apparent modifications, the concepts and approach mentioned in first method also apply to this method.

Still, another method is possible because recently has become possible to cool atoms down to within a few billionths of a degree kelvin. An object so close to absolute zero in temperature has a position (as defined by, say, its center of mass) which is known with great precision. By the Heisenberg certainty principle, its momentum then possess a certain corresponding degree of uncertainty. As a result, the object begins to move in apparently random directions. By sensing and recording such (at least somewhat) random changes in direction (or rather, in momentum), it should be possible to produce random numbers of random bits. The more exactly the change in momentum can be recorded, the more random bits can be generated at once.

There have been thus described preferred and alternative embodiments of a random number generator. While preferred embodiments have been described and disclosed, it will be recognized by those with skill in the art that modifications are within the true spirit and scope of the invention. The appended claims are intended to cover such modifications.

I claim:

1. A random number generator comprising:
   a detector having a needle positioned within the detector, the needle to generate random electrons, the detector to detect the random electrons; and
   a recording system coupled to the detector to record the detected random electrons for use in generating random numbers.

2. The apparatus defined in claim 1 wherein the needle comprises an electrically grounded needle.

3. The apparatus defined in claim 2 wherein the electrically grounded needle is coated with a dielectric.

4. The apparatus defined in claim 2 wherein the electrically grounded needle is coated with a material having a selected electron emission probability.

5. The apparatus defined in claim 4 wherein the material comprises one selected from a group comprising gold and silver.

6. The apparatus defined in claim 4 wherein the material comprises a dielectric material.

7. The apparatus defined in claim 1 wherein the needle comprises a negatively charged needle.

8. The apparatus defined in claim 7 wherein the negatively charged needle is held at a constant value.

9. The apparatus defined in claim 1 wherein the needle comprises a positively charged needle.

10. The apparatus defined in claim 9, wherein the needle is enclosed within the detector, the detector further comprising an inert gas at a controlled concentration, the needle to generate positive ions.

11. The apparatus defined in claim 9 wherein the positively charged needle is held at a constant value.

12. The apparatus defined in claim 1 wherein the needle comprises a material selected from a group including brass and copper.

13. A random number generator comprising:
   a detector having a closed off detector containing material with thermionic emission capabilities to emit random electrons, the detector to detect the random electrons; and
   a recording system coupled to the detector to record the detected random electrons for use in generating random numbers.

14. A random number generator comprising:
   a source to spontaneously generate quantum phenomena; and
   a detector of the quantum phenomena, wherein the source is within the detector.

15. The random number generator defined in claim 14 wherein the generated phenomena comprises photons.

16. The random number generator defined in claim 14 wherein the generated phenomena comprises electrons.

17. The random number generator defined in claim 14 wherein the source generates the quantum phenomena based, at least in part, on source temperature.

18. The random number generator defined in claim 17 wherein the source temperature is a controlled source temperature.

19. The random number generator defined in claim 14 wherein the source generates the quantum phenomena based at least in part, on chemical composition of the source.

20. The random number generator defined in claim 14 wherein the source generates quantum phenomena based, at least in part, on a controllable surface area of the source.

21. The random number generator defined in claim 14 wherein the generated phenomena comprises positive ions.

22. The random number generator defined in claim 14 wherein the source generates the quantum phenomena based at least in part, on source voltage.

23. A random number generator comprising:
    a source to spontaneously generate quantum phenomena based, at least in part, on ambient source temperature;
    a detector to detect the quantum phenomena; and
    a recording system coupled to receive indications of detections made by the detector.

24. The random number generator defined in claim 23 wherein the generated phenomena comprises photons.

25. The random number generator defined in claim 23 wherein the generated phenomena comprises electrons.

26. The random number generator defined in claim 23 wherein the source is inside the detector.

27. The random number generator defined in claim 23 wherein the source generates the quantum phenomena based at least in part, on chemical composition of the source.

28. A random number generator comprising:
    a detector to detect a plurality of random electrons, the detector within an enclosure;
    one or more sharp protrusions protruding from a thermally controlled base within the enclosure, the one or more sharp protrusions to generate the plurality of random electrons; and
    a recording system coupled to the detector to record the detected random electrons for use in generating random numbers.

* * * * *